United States Patent [19]
Wüsten

[11] Patent Number: 5,562,194
[45] Date of Patent: Oct. 8, 1996

[54] CONVEYOR-DISPLACING SYSTEM AND METHOD FOR MINING OPERATION

[75] Inventor: Klaus Wüsten, Moers, Germany

[73] Assignee: Krupp Fordertechnik GmbH, Duisburg, Germany

[21] Appl. No.: 599,998

[22] Filed: Feb. 14, 1996

[30] Foreign Application Priority Data

Mar. 6, 1995 [DE] Germany ............... 195 07 655.9
May 5, 1995 [DE] Germany ............... 195 16 473.3

[51] Int. Cl.⁶ ................................. B65G 65/02
[52] U.S. Cl. ............................. 198/309; 198/861.2
[58] Field of Search ................. 198/300, 309, 198/312, 315, 316.1, 861.2; 299/64

[56] References Cited

U.S. PATENT DOCUMENTS

| | | | |
|---|---|---|---|
| 3,612,257 | 10/1971 | Goergen et al. | 198/309 |
| 4,139,087 | 2/1979 | Westhoff et al. | 198/309 |
| 4,206,840 | 6/1980 | Hanson | 198/301 |
| 4,538,722 | 9/1985 | Sumner | 198/309 X |

FOREIGN PATENT DOCUMENTS

| | | | |
|---|---|---|---|
| 1090573 | 10/1960 | Germany | 198/315 |
| 3040795 | 6/1982 | Germany. | |
| 3409297 | 9/1985 | Germany. | |
| 3513317 | 2/1986 | Germany. | |

*Primary Examiner*—James R. Bidwell
*Attorney, Agent, or Firm*—Herbert Dubno; Andrew Wilford

[57] ABSTRACT

A bulk conveyor system has a longitudinally extending conveyor belt, devices at the ends for tensioning and relaxing the belt and for advancing the belt, a carriage movable along the belt between the ends, and a transverse conveyor cooperating with the belt, mounted on the carriage, and extending from the belt to a pickup/deposition location. This conveyor is laterally shifted through a predetermined turnover distance by first displacing the carriage longitudinally along the belt from one of the ends to the other end while lifting the belt and deflecting it transversely at the carriage along an S-path through the turnover distance thereby leaving the belt offset transversely at the other end by the turnover distance from the one end. Then the belt is arrested and transversely shifted at the other end of the belt by the carriage through twice the turnover distance. The belt is then relaxed and the device at the other end is shifted transversely by the carriage through twice the turnover distance.

6 Claims, 5 Drawing Sheets

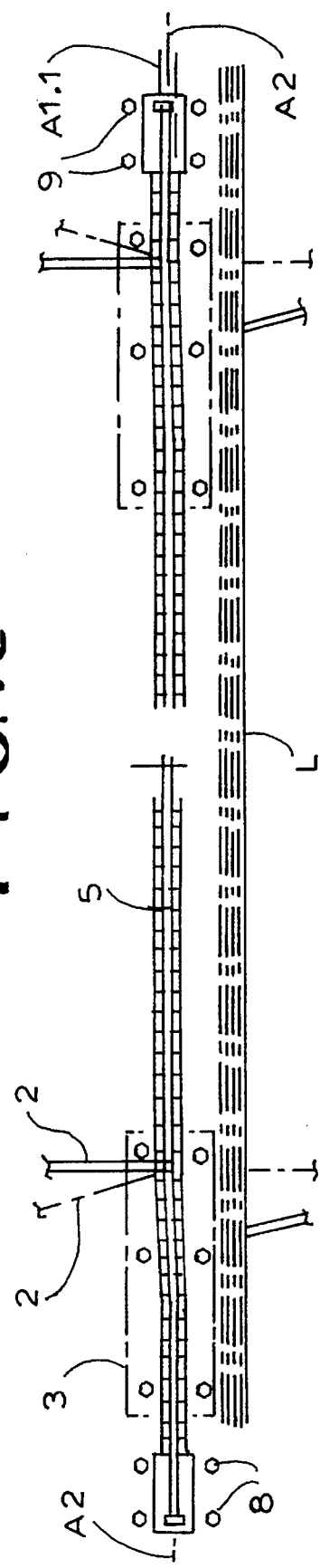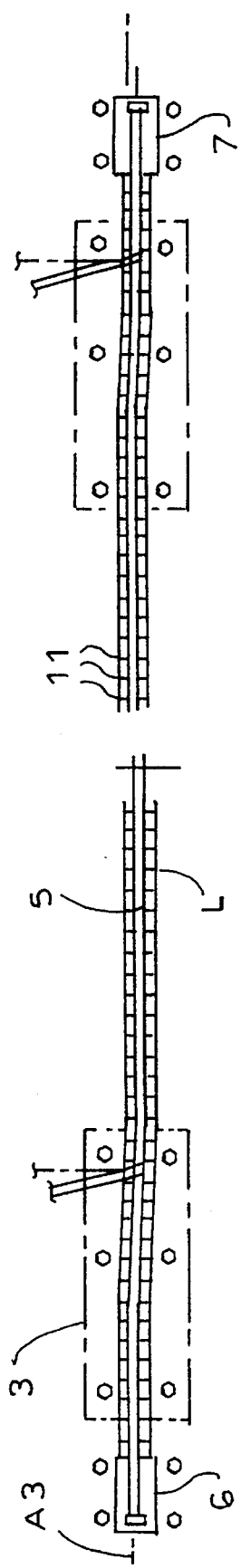

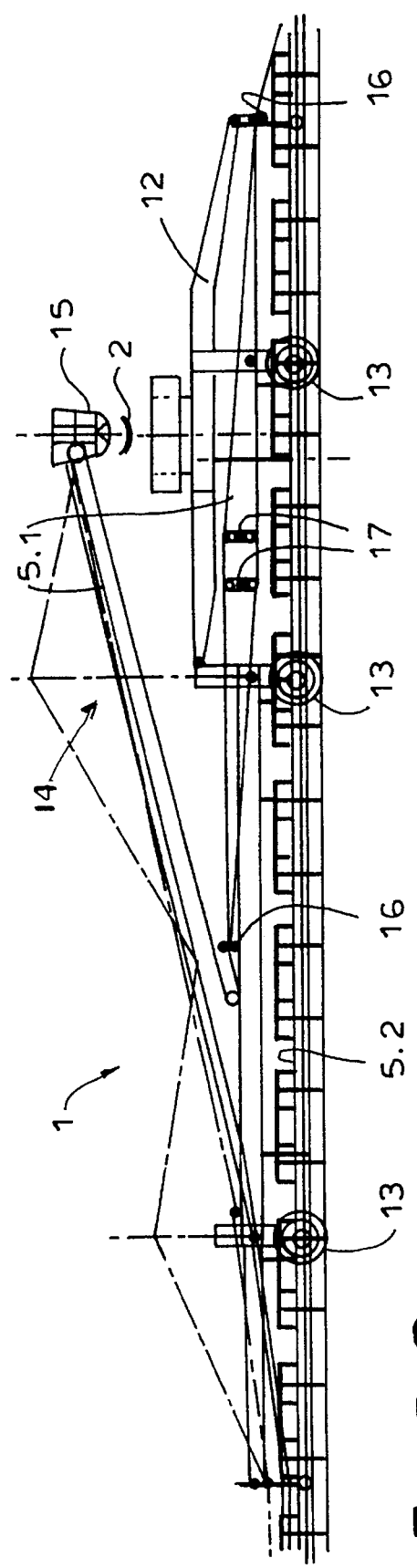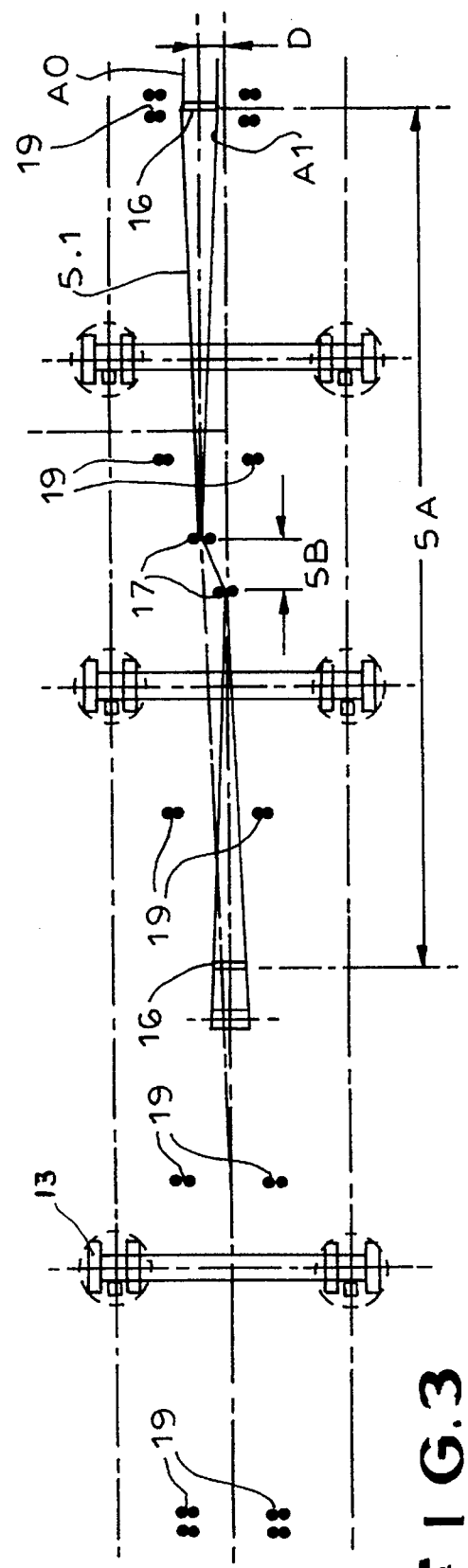

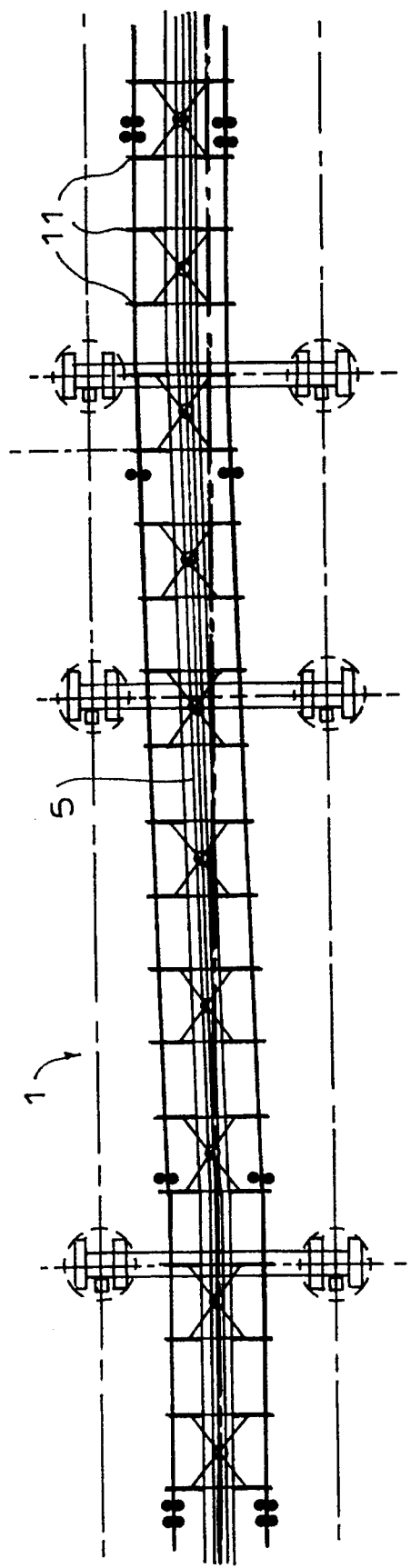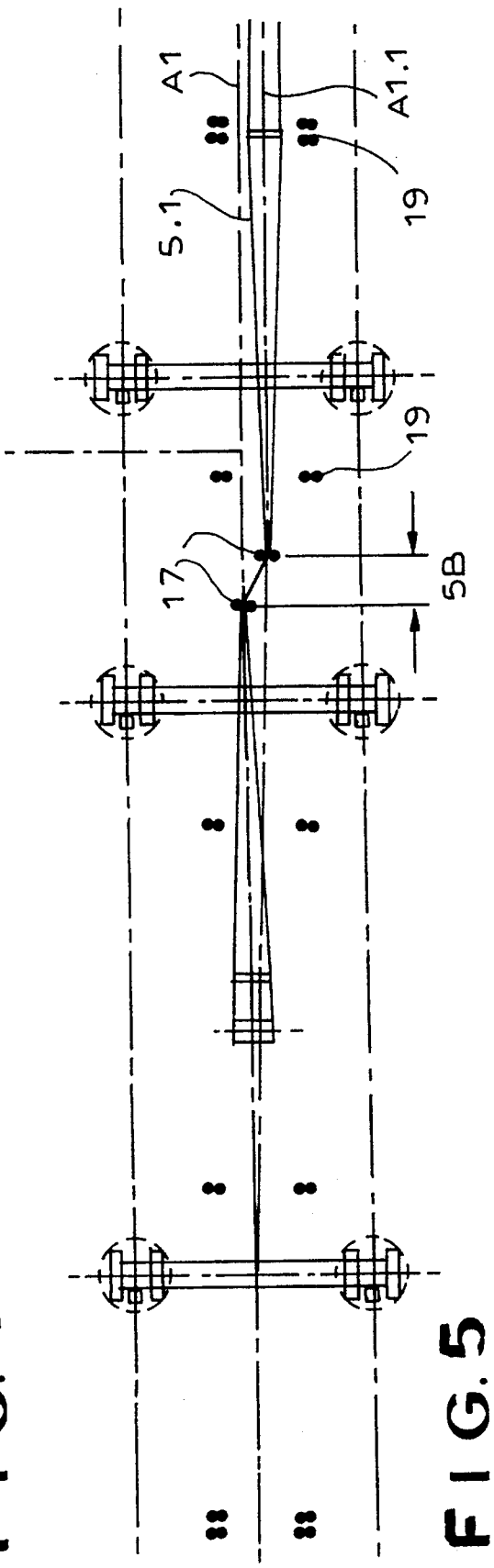
FIG. 4
FIG. 5

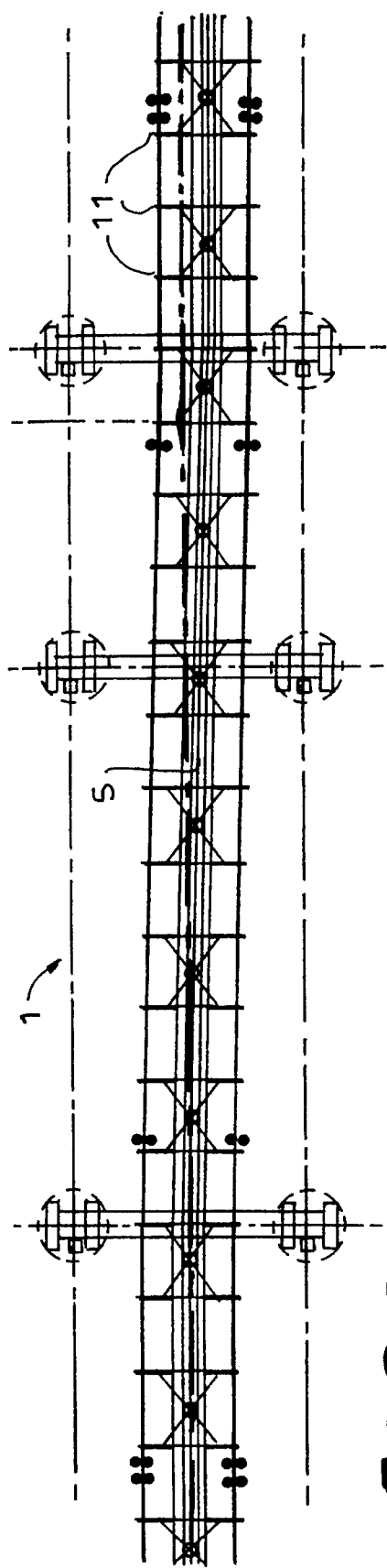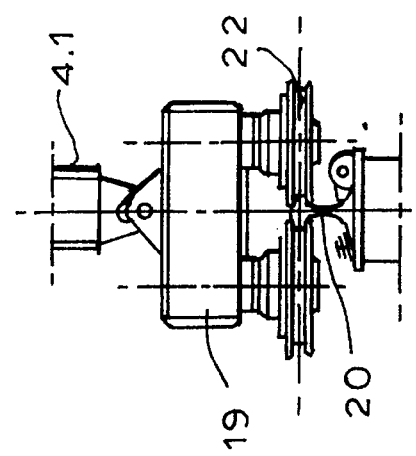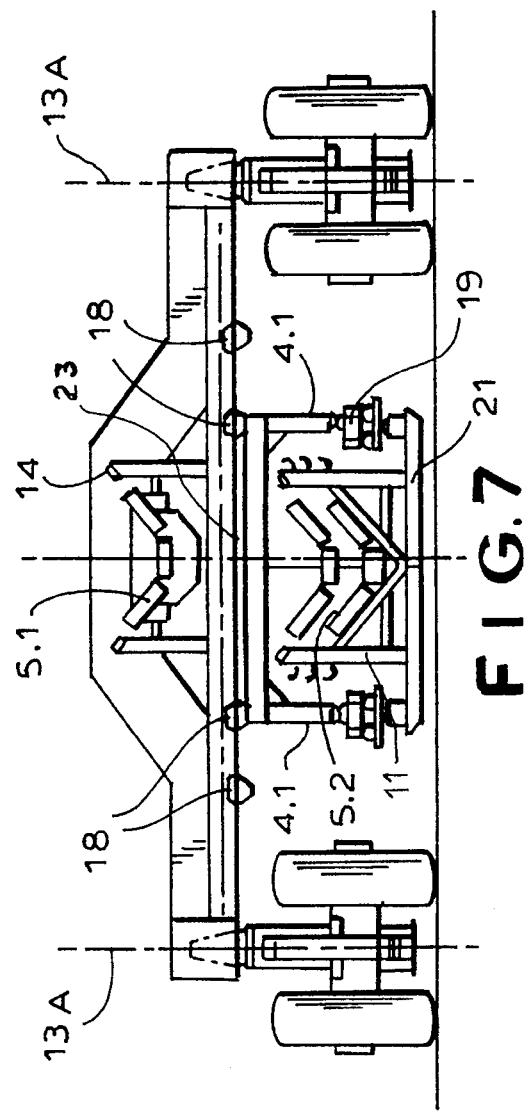

CONVEYOR-DISPLACING SYSTEM AND METHOD FOR MINING OPERATION

FIELD OF THE INVENTION

The present invention relates to a conveyor system of the type normally used in a mining operation. More particularly this invention concerns a method of and apparatus or system for transversely displacing a loading or unloading conveyor.

BACKGROUND OF THE INVENTION

In a cyclic mining operation, a spoil-depositing system, or the like it is standard to operate with a very long longitudinally extending main conveyor and a somewhat shorter transverse conveyor. The transverse conveyor has one end at a face or deposition location and an opposite end above or below a loop of the upper stretch of the main conveyor. A carriage carries the transverse conveyor and loops the belt of the main conveyor so that material can either be picked up by the transverse conveyor and dumped on the main conveyor or can be dumped by the main conveyor onto the transverse conveyor which in turn deposits it along a pile.

Whether the system is used to load or unload the bulk material, typically ore, it is necessary to periodically displace it transversely through a turnover distance which is a predetermined transverse distance which can be 30 m to 50 m, so that a new cut can be taken from a face or a new row can be formed on the pile. This is typically done as described in U.S. Pat. No. 4,538,722 by longitudinally displacing along the main conveyor a carriage that lifts the conveyor, displaces it transversely, and sets it down.

In other known systems seen for example in German 3,040,795 of Kolbl and 3,513,317 of Hashimoto the conveyor must be stopped when it is shifted. Other systems seen in German 3,409,297 of Faur et al and U.S. Pat. No. 4,206,840 of Hanson suggest other solutions, but none proposes an arrangement that does not require the conveyor to be shut down for an extensive time to allow for its transverse shifting. Most are bulky and greatly decrease the overall efficiency of the bulk-conveying operation.

OBJECTS OF THE INVENTION

It is therefore an object of the present invention to provide an improved bulk conveyor system and method.

Another object is the provision of such an improved bulk conveyor system and method which overcomes the above-given disadvantages, that is which can shift the conveyor while it is operating and that requires only minimal down time of the conveyor during each transverse shift.

SUMMARY OF THE INVENTION

A bulk conveyor system has a longitudinally extending conveyor belt, devices at the ends for tensioning and relaxing the belt between the ends and for advancing the belt longitudinally between the ends, a carriage movable longitudinally along the belt between the ends, and a transverse conveyor cooperating with the belt, mounted on the carriage, and extending transversely from the belt to a pickup/deposition location. This conveyor is laterally shifted through a predetermined turnover distance by first displacing the carriage longitudinally along the belt from one of the ends to the other end while lifting the belt and deflecting it transversely at the carriage along an S-path through the turnover distance thereby leaving the belt off-set transversely at the other end by the turnover distance from the one end. Then the belt is arrested and transversely shifted at the other end of the belt with the carriage through a distance equal to twice the turnover distance. The belt is then relaxed and the device at the other end of the belt is shifted transversely by the carriage through a distance equal to twice the turnover distance. The belt is then retensioned and its advance is restarted while the carriage is displaced longitudinally along the belt from the other end to the one end while lifting the belt and deflecting it transversely along an S-path through the turnover distance. Then the belt is relaxed, arrested, and transversely shifted with the end device at the one end by means of the carriage through a distance equal to twice the turnover distance. Thereafter these steps are repeated sequentially.

According to the invention the belt can be shifted through a relatively small turnover distance, typically about 1 m, so that the belt can continue to operate while being shifted without being seriously stressed. A relatively long portion of the belt can be lifted and deflected so that once again damage to the belt from the transverse shifting is largely eliminated.

According to the invention the belt has a stretch with to one longitudinal side of the carriage a load-carrying portion and to an opposite longitudinal side of the carriage a load-free portion. The load-free portion is raised and deflected through an S-path by the carriage. More specifically, the load-free portion is deflected through an S-path by sequentially deflecting the load-free portion from a generally horizontal orientation to a generally vertical orientation, deflecting the vertically oriented load-free portion through an S-path about two upright axes, and deflecting the vertically oriented load-free portion back to a horizontal orientation. The belt is under tension when it is deflected.

The bulk conveyor system according to the invention thus has a longitudinally extending conveyor belt having a load-carrying stretch and a load-free stretch, means at the ends for tensioning and relaxing the belt between the ends and for advancing the belt longitudinally between the ends, and a carriage movable longitudinally along the belt between the ends. Two longitudinally spaced pairs of horizontal rollers on the carriage pinch the load-free belt portion and two longitudinally spaced vertical rollers engaging the load-free belt portion between the pairs of horizontal rollers are spaced apart transversely by a turnover distance so that the load-free belt portion is deflected by the distance through an S-path between the vertical rollers. A transverse conveyor cooperating with the belt and mounted on the carriage extends transversely from the belt to a pickup/deposition location. The carriage is displaced longitudinally along the belt between the ends while lifting the belt and deflecting it transversely at the carriage along the S-path with the rollers and thereby leaving the belt offset transversely at its ends. The carriage and the belt are transversely shifted at each end of the belt with the carriage through a distance equal to twice the turnover distance.

The carriage is provided with guides for deflecting the load-carrying stretch through-a loop at the transverse conveyor.

BRIEF DESCRIPTION OF THE DRAWING

The above and other objects, features, and advantages will become more readily apparent from the following description, reference being made to the accompanying drawing in which:

FIGS. 1a through 1d are small-scale and schematic top views illustrating four succeeding steps in a conveyor-shifting cycle;

FIG. 2 is a partly diagrammatic and small-scale side view illustrating the deflecting carriage;

FIG. 3 is a wholly schematic top view illustrating how the belt is deflected by the carriage as shown in FIG. 1a;

FIG. 4 is a schematic top view corresponding to FIG. 3;

FIGS. 5 and 6 are views like respective FIGS. 3 and 4 but showing deflection as shown in FIG. 1b;

FIG. 7 is a partly sectional end view of the assembly of this invention; and

FIG. 8 is a large-scale view of a detail of FIG. 7.

SPECIFIC DESCRIPTION

Figure 1A:
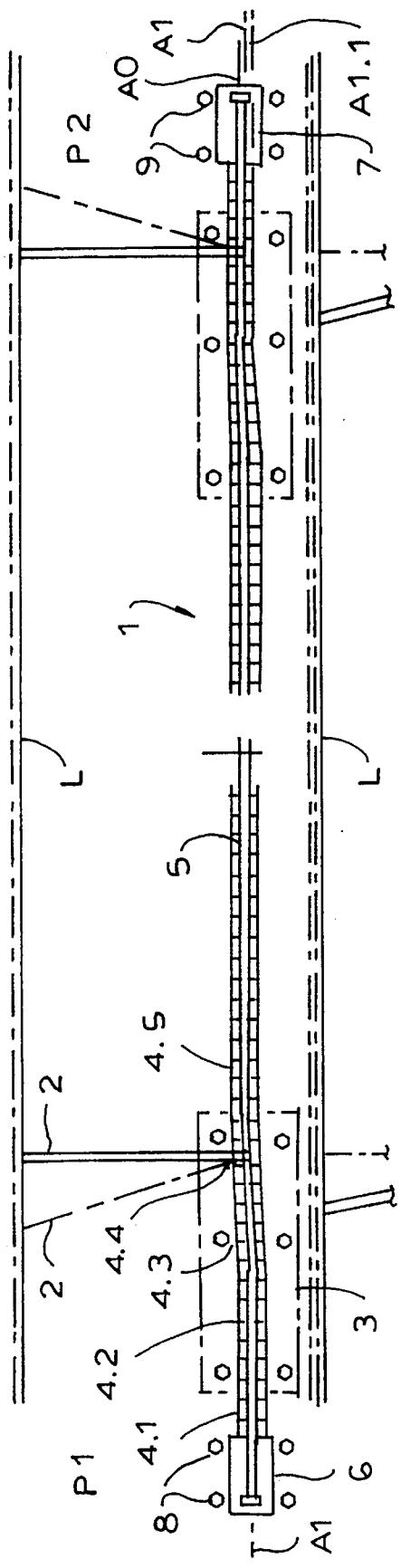

As seen in the drawing a conveyor-belt assembly 1 has a belt 5 carried on supports 11 that are coupled longitudinally together end-to-end but that can be pivoted somewhat relative to each other about vertical axes so that the assembly 1 can be deflected laterally. The belt 5 has an upper stretch 5.1 that carries material longitudinally from, as seen in FIGS. 1 through 6, a left-hand end to a transverse takeoff conveyor 2 (FIG. 2) that dumps the material on a pile along a discharge line L. The machine could work also oppositely with the conveyor 2 depositing material on the upper stretch 5.1 for conveyance to a discharge site at the end of the belt assembly 1.

The lower return stretch 5.2 extends generally parallel to the ground from a drive unit 6 at one end of the assembly 1 to a reversing unit 7 at the opposite end. These units 6 and 7 are provided with respective wheel assemblies 8 and 9 that allow them to be shifted transversely, that is their wheels are rotatable about axes extending longitudinally parallel to the belt assembly 1.

A deflecting carriage 3 shown as a simple dot-dash box in FIGS. 1a through 1d and in more detail in FIGS. 2 and 7 has a frame 12 provided with a roller-type support assembly 14 that engages the upper stretch 5.1 and deflects it upward in a loop so it can deposit material at a transfer station 15 or receive it from the transverse loading/unloading conveyor 2 that is carried by the carriage 3.

An unloaded or empty portion or region 5A of the upper stretch 5.1 located downstream of the transfer station 15 passes over pairs of rollers 16, 17 which engage the upper stretch 5.1 from both sides and which are mounted on the frame 12. In the illustrated embodiment there are two such pairs of rollers 16, 17, the rollers 16 being rotatable about horizontal axes and the roller 17 being rotatable about vertical axes between the horizontal axes of the rollers 16. Thus the flat cross section of the upper stretch 5.1 engaged between the first pair or rollers 16 is twisted on the way to from the first rollers 16 to the first rollers 17 through 90° into a vertical orientation in which it remains to the second pair or rollers 17 (portion 5B in FIG. 3) and is then twisted back on the way to the second pair of horizontal rollers 16 into a horizontal orientation. The two pairs of rollers 17 defining the portion 5B of the upper stretch 5.1 are offset laterally with regard to the longitudinal axis of the conveyor belt assembly in order to give the upper stretch 5.1 an S-shape seen from above.

The carriage 3 is equipped with six wheel assemblies 13 that can pivot about respective vertical axes 13A from positions running parallel to the belt assembly 1 and 90° offset positions running perpendicular thereto.

The carriage 3 has five sets of lifters 4.1 through 4.5 as indicated in FIGS. 1a through 1d and hydraulic shifters 23 (FIG. 7) to shift them laterally or transversely with regard to the main axis of the assembly 1. Guides 18 are provided on the frame 12 to allow the lifters 4.1–4.5 to be set at transversely offset positions.

At the lower end of the lifters 4.1–4.5 there are shifting heads 19 with rollers 22 engaging rails 20 (FIG. 8) mounted on skids or crossties 21 on which in turn are mounted the supports 11 carrying the lower stretch 5.2 of the belt 5.

The lifters 4.1–4.5 have a specific length that is so dimensioned that during movement of the carriage 3 and frame 12 along the belt 5 the skids 21 and supports 1 are lifted from the ground and dropped back to the ground when the carriage 3 passes. The lifters 4.1–4.5 are laterally offset to form an S-shaped configuration as seen from above. Thus the supports 21 are laterally shifted by one turnover distance D during movement of the carriage 3.

This system operates as follows:

As seen in FIG. 1a in a starting position the conveyor belt 5 is centered at the reversing unit 7 on a longitudinal axis A0 and at the drive unit 8 on an axis A1 parallel to the axis A0 but offset therefrom by the standard turnover distance D (FIG. 3). The carriage 3, starting in position P1 at the left drive end moves longitudinally with the lifters 4.1 through 4.5 raising and deflecting the frames in an S-shape and then setting them down with the belt 5 centered on the offset axis A1 until the carriage reaches the opposite end position P2. Meanwhile the transverse conveyor 2 is receiving the material from the uplifted loop of the upper stretch 5.1 and depositing it along the line L. The belt 5 is under tension.

Figure 1B:
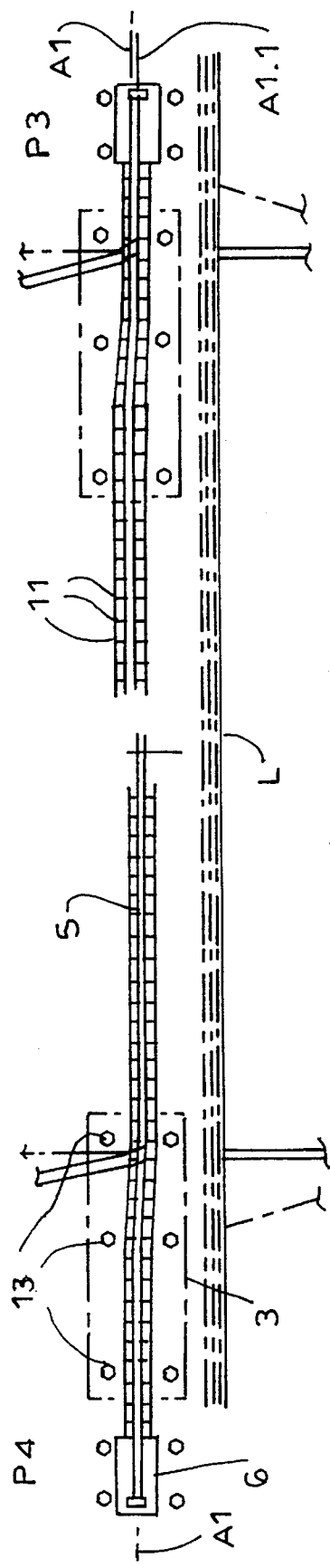

Once end position P2 is reached the tension in the belt 5 is relaxed and the shifters 23 move the lifters 4.1 through 4.5 and, engaged by them, the support 11 Just under the carriage 3 laterally through a distance equal to twice the turnover D so that the end of the belt 5 is shifted from the axis A0 to the axis A1.1 to the position P3 as shown in FIG. 1b.

Simultaneously the reversing unit 7 is moved laterally by twice the turnover distance D from axis A0 to axis A1.1. Then the belt 5 is retensioned.

The carriage 3 remains on axis A1 and the transverse conveyor 2 is inclined so that the material to be unloaded falls down by one turnover distance D offset to line L.

During travel of the carriage 3 from the position P3 to the position P4 the supports 11 are lifted by the lifters 4.1 and shifted from axis A to axis A1.1 by lifters 4.2 through 4.4 and finally is set back on the ground on axis A1.1 by the lifters 4.5.

On arrival of the carriage 3 at the position P4 the belt 5 is again relaxed. Then the shifters 23 are operated and the supports 11 Just under the carriage 3 are shifted through twice the turnover distance D as described above. The wheel assemblies 13 are then rotated about the respective vertical axes 13A through 90° and the carriage 3 and the drive unit 6 are moved through 2D to sit on axis A2.

Then the wheel assemblies 123 are rotated back for return movement of the carriage along the belt 5.

I claim:

1. A method of shifting through a predetermined transverse turnover distance a bulk conveyer system having a longitudinally extending conveyer belt;

means at the ends for tensioning and relaxing the belt between the ends and for advancing the belt longitudinally between the ends;

a carriage movable longitudinally along the belt between the ends; and a transverse conveyer cooperating with the belt, mounted on the carriage, and extending transversely from the belt to a pickup/deposition location, the method comprising the steps of sequentially:
a) displacing the carriage longitudinally along the belt from one of the ends to the other end while lifting the belt and deflecting it transversely by the carriage along an S-path through the turnover distance thereby leaving the belt offset transversely at the other end by the turnover distance from the one end;
b) arresting the belt and transversely shifting the belt at the other end of the belt by the carriage through a distance equal to twice the turnover distance;
c) relaxing the belt and transversely shifting the means at the other end of the belt by the carriage through a distance equal to twice the turnover distance;
d) tensioning and advancing the belt and displacing the carriage longitudinally along the belt from the other end to the one end while lifting the belt and deflecting it transversely along an S-path through the turnover distance;
e) relaxing and arresting the belt and transversely shifting the belt and the means at the one end by the carriage through a distance equal to twice the turnover distance; and
f) thereafter repeating steps a) through e) sequentially.

2. The conveyor-shifting system defined in claim 1 wherein the belt has a stretch with to one longitudinal side of the carriage a load-carrying portion and to an opposite longitudinal side of the carriage a load-free portion, the load-free portion being raised and deflected through an S-path by the carriage in steps a) and d).

3. The conveyor-shifting system defined in claim 2 wherein the load-free portion is deflected through an S-path in steps a) and d) by sequentially deflecting the load-free portion from a generally horizontal orientation to a generally vertical orientation, deflecting the vertically oriented load-free portion through an S-path about two upright axes, and deflecting the vertically oriented load-free portion back to a horizontal orientation.

4. The conveyor-shifting system defined in claim 1 wherein the belt is under tension during steps a) and d).

5. A bulk conveyor system having a longitudinally extending conveyor belt having a load-carrying stretch and a load-free stretch;

means at the ends for tensioning and relaxing the belt between the ends and for advancing the belt longitudinally between the ends;

a carriage movable longitudinally along the belt between the ends;

two longitudinally spaced pairs of horizontal rollers pinching the load-free belt portion;

two longitudinally spaced vertical rollers engaging the load-free belt portion between the pairs of horizontal rollers and spaced apart transversely by a turnover distance, whereby the load-free belt portion is deflected by the distance through an S-path between the vertical rollers;

a transverse conveyor cooperating with the belt, mounted on the carriage, and extending transversely from the belt to a pickup/deposition location;

means for displacing the carriage longitudinally along the belt between the ends while lifting the belt and deflecting it transversely at the carriage along the S-path with the rollers and thereby leaving the belt offset transversely at its ends; and means for transversely shifting the carriage and the belt at each end of the belt by the carriage through a distance equal to twice the turnover distance.

6. The bulk conveyor system defined in claim 5 wherein the carriage is provided with guides for deflecting the load-carrying stretch through a loop at the transverse conveyor.

* * * * *